No. 793,482. PATENTED JUNE 27, 1905.
R. WEEKS.
HARNESS.
APPLICATION FILED SEPT. 13, 1904.
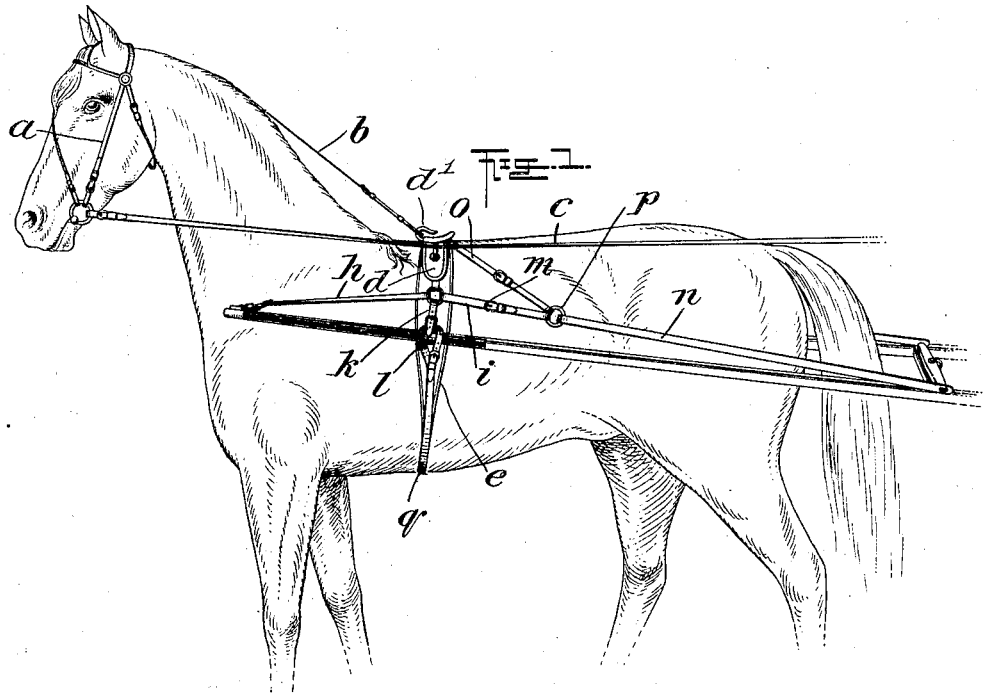
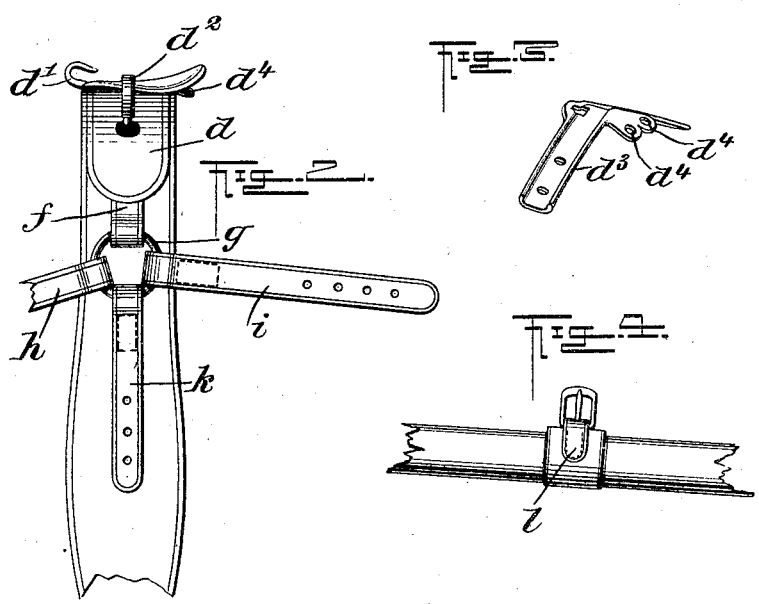
WITNESSES:
INVENTOR
Robert Weeks
BY
ATTORNEYS No. 793,482.

Patented June 27, 1905.

UNITED STATES PATENT OFFICE.

ROBERT WEEKS, OF CARMEL, NEW YORK.

HARNESS.

SPECIFICATION forming part of Letters Patent No. 793,482, dated June 27, 1905.

Application filed September 13, 1904. Serial No. 224,254.

*To all whom it may concern:*

Be it known that I, ROBERT WEEKS, a citizen of the United States, and a resident of Carmel, in the county of Putnam and State of New York, have invented a new and Improved Harness, of which the following is a full, clear, and exact description.

The invention relates particularly to what is generally known as "track-harness"—that is, harness intended for light or racing vehicles.

The object of the invention is to minimize the parts of the harness without lessening its efficiency for the purpose specified, thereby not only simplifying the rig, but lightening the load on the horse and permitting the horse greater freedom of movement.

The further object of the invention is to provide a strictly crupperless harness, thus taking from the tail of the horse the strain of the checkrein, which has been common heretofore, and dispensing with the back-strap.

This end I attain by certain novel features of construction, which will be fully set forth hereinafter and pointed out in the claims.

Reference is had to the accompanying drawings, which illustrate as an example the preferred embodiment of my invention, in which drawings like characters of reference indicate like parts in the several views, and in which—

Figure 1 is a view showing the harness applied. Fig. 2 is an enlarged side view of the saddle. Fig. 3 is a detail perspective of the metallic frame of the saddle, and Fig. 4 is a detail view of the buckles for supporting the shafts.

In Fig. 1, $a$ indicates the bridle, $b$ the checkrein, and $c$ the driving-reins, which parts are not directly concerned with my invention.

$d$ indicates the saddle, having the checkhook $d'$ and rein-guides $d^2$, as usual. The frame $d^3$ of the saddle, as shown in Fig. 3, is provided with two eyes $d^4$, projecting from the rear of the saddle, as may be seen with respect to one of the eyes in Fig. 2. The saddle is fastened in place by a strap or band $e$, joined to the skirts of the saddle, as usual.

Depending from each side of the saddle is a strap or connection $f$, to which is joined a ring $g$. These rings carry holdback-straps $h$, trace-straps $i$, and shaft-supporting straps $k$. The holdback-straps $h$ extend forward and are connected in any desired manner to the front ends of the respective shafts. The shaft-supporting straps $k$ extend downward and are joined by a fastening—such, for example, as the buckles $l$—to the shafts of the vehicle. The trace-straps $i$ extend rearward and are connected by buckles $m$ or their equivalents to the traces $n$, the traces extending rearward and being connected to the whiffletree, as shown. Joined to the eyes $d^4$ of the saddle-frame $d^3$ are straps $o$, which extend downward and rearward and are connected the same as the straps $i$ to the respective traces $n$, this connection being preferably effected through the medium of rings $p$, as shown. The shafts are held down in proper position by a strap $q$, which is joined to the shafts and passes under the body of the horse, as shown. By this arrangement the shafts are supported properly at the side of the horse and prevented from excessive movement in both the upward and downward directions. By means of the holdback-straps and traces $n$ the correct position of the vehicle with respect to the horse is maintained, and the vehicle may be held back or drawn forward through the action of these straps, as will be apparent. The straps $o$, constituting an important feature of my invention, serve to hold the saddle in correct position and to prevent it from being drawn forward by the checkrein. These straps are connected to the traces, and the strain of the checkrein is therefore exerted on the traces and not on a crupper or on a back-strap, as heretofore. It will be seen, therefore, that I provide a strictly crupperless harness, and not only do I give the horse absolute freedom of action, but I avoid the inhuman practice of a strain between the neck and tail of the horse.

If desired, the straps $o$ may be connected with the shafts instead of the traces, and in either case the effect will be the same, although I prefer to connect the strap to the traces, as shown.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A harness having a saddle adapted to be connected with a checkrein, traces, means connecting the traces with the saddle at the sides of the saddle, and means connected with the middle portion of the saddle and extending downward and rearward to the traces to receive the strain of the checkrein.

2. A harness having a saddle provided with a check-hook for connection with the checkrein, two eyes projecting from the middle portion of the saddle at the rear, straps connected to the said eyes and extending downward and rearward at each side of the horse, and means for connecting said straps with the vehicle.

3. A harness comprising a saddle adapted to be connected with the checkrein, holdback-straps in connection with the saddle and adapted to be connected to the shafts of the vehicle, traces, means connecting the traces with the saddle at each side thereof, and means extending from the middle portion of the saddle downward and rearward to the traces to transmit thereto the strain of the checkrein.

4. A harness comprising a saddle adapted to be connected with a checkrein, traces, straps connecting the traces with the saddle at the sides thereof, holdback-straps for connecting the saddle with the front ends of the shafts, a strap for connection with the shafts and adapted to pass under the body of the horse, and straps connected at their upper ends with the rear middle portion of the saddle and extending downward and rearward, the said straps being connected at their lower ends with the traces.

In testimony whereof I have signed my name to this specification in the presence of two subscribing witnesses.

ROBERT WEEKS.

Witnesses:
WILLIAM H. WEEKS,
EDWARD C. WEEKS.